US011180999B2

(12) United States Patent
Decesare et al.

(10) Patent No.: US 11,180,999 B2
(45) Date of Patent: Nov. 23, 2021

(54) CERAMIC MATRIX COMPOSITE COMPONENT AND METHOD OF PRODUCING A CERAMIC MATRIX COMPOSITE COMPONENT

(71) Applicant: General Electric Company, Schenectady, NY (US)

(72) Inventors: Douglas Glenn Decesare, Queensbury, NY (US); Daniel Gene Dunn, Guilderland, NY (US); Thomas Earl Dyson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 16/722,949

(22) Filed: Dec. 20, 2019

(65) Prior Publication Data
US 2021/0189889 A1 Jun. 24, 2021

(51) Int. Cl.
*F01D 5/28* (2006.01)
*C04B 35/80* (2006.01)

(52) U.S. Cl.
CPC ............ *F01D 5/282* (2013.01); *C04B 35/806* (2013.01); *F01D 5/284* (2013.01); *C04B 2235/616* (2013.01); *C04B 2237/365* (2013.01); *C04B 2237/385* (2013.01); *F05D 2220/32* (2013.01); *F05D 2230/31* (2013.01); *F05D 2300/6033* (2013.01)

(58) Field of Classification Search
CPC .......... F01D 5/282; F01D 5/284; F01D 5/187; F05D 2220/32; F05D 2230/31; F05D 2300/6033; F05D 2300/6034; B32B 18/00; C04B 38/0003; C04B 35/80; C04B 35/806; C04B 2235/616; C04B 2237/365; C04B 2237/385; C04B 2111/00982; C04B 2235/5212; C04B 2237/76; C04B 2237/62; C04B 2237/38
See application file for complete search history.

(56) References Cited

U.S. PATENT DOCUMENTS 6,733,907 B2 5/2004 Morrison et al.
7,600,979 B2 * 10/2009 Steibel .................. C04B 35/573
416/230
8,202,588 B2 6/2012 Keller et al.
(Continued)

*Primary Examiner* — Jacob M Amick
*Assistant Examiner* — Charles J Brauch
(74) *Attorney, Agent, or Firm* — Dority & Manning, P.A.

(57) ABSTRACT

A method of producing a ceramic matrix composite component. The method includes positioning a first plurality of ceramic matrix composite plies on top of one another, disposing a filler pack on the first plurality of ceramic matrix composite plies, and positioning a second plurality of ceramic matrix composite plies on top of the filler pack. One of the first plurality of ceramic composite plies or the second plurality of ceramic composite plies includes a bend angle, to define an interstice between the plurality of ceramic matrix composite plies with the filler pack disposed in the interstice. The filler pack includes one or more sacrificial fibers disposed therein, that subsequent to removal provide a functional feature, such as a cooling manifold in the filler pack. The method further includes forming one or more channels coupled to the one or more functional features for the flow of a cooling fluid therethrough. A ceramic matrix composite is also disclosed.

20 Claims, 7 Drawing Sheets

(56) References Cited

U.S. PATENT DOCUMENTS

| | | |
|---|---|---|
| 8,257,809 B2 | 9/2012 | Morrison et al. |
| 10,017,425 B2 | 7/2018 | Tuertscher et al. |
| 2002/0076541 A1 | 6/2002 | Jarmon et al. |
| 2003/0059577 A1 | 3/2003 | Morrison et al. |
| 2016/0084092 A1 | 3/2016 | Cairo et al. |
| 2017/0101873 A1 | 4/2017 | Morgan et al. |
| 2017/0122113 A1 | 5/2017 | Kittleson et al. |
| 2017/0328217 A1 | 11/2017 | Gallier et al. |
| 2018/0328189 A1 | 11/2018 | Frey et al. |

\* cited by examiner

CERAMIC MATRIX COMPOSITE COMPONENT AND METHOD OF PRODUCING A CERAMIC MATRIX COMPOSITE COMPONENT

The present invention relates generally to gas turbines for power generation and more specifically to methods of forming ceramic matrix composite components for hot gas path turbine components for gas turbines.

BACKGROUND

As with turbine blades and vanes formed from more conventional superalloy materials, CMC blades and vanes are primarily equipped with cavities and cooling voids to reduce weight, reduce centrifugal load, and reduce operating temperatures of the components. These features are typically formed in CMC components using a combination of removable and expendable tooling, drilling or the like. Internal cooling channels are advantageous for cooling the both metal and CMC hot-gas path hardware as they reduce cooling flow requirements and thermal gradients/stress.

Silicon carbide (SiC)-based ceramic matrix composite (CMC) materials have been proposed as materials for certain components of gas turbine engines, such as the turbine blades, vanes, nozzles, shrouds and buckets. Various methods are known for fabricating SiC-based components, including Silicomp, melt infiltration (MI), chemical vapor infiltration (CVI), polymer inflation pyrolysis (PIP), and oxide/oxide methods. Though these fabrication techniques significantly differ from each other, each involves the use of hand lay-up and tooling or dies to produce a near-net-shape part through a method that includes the application of heat at various method stages.

In many instances, during the layup method, curved components often generate spaces, and more particularly gaps or interstices where different orientations and/or bend radii of the CMC plies occur. In order to provide maximum strength, these gaps or interstices between the plies must be filled with a filler pack. These areas are difficult to cool using conventional methods due to large spacing that may be found between the cold and hot gases.

Current fabrication methods for forming internal passages or cavities in these gaps or interstices of CMC components include drilled cooling channels through the filler pack to a source of cooling air. Connections are also made to the hot gas path. Cooling is provided by a combination of impingement and flow through the connecting holes. Typically, the drilling method is straight through the laid up layers into the gap or interstices and through the filler pack, sometimes referred to as line-of-sight drilling, requiring cutting or breaking of the fibers which results in weakening the overall structure. In addition, the filler packs frequently contain defects that become insulating pockets.

Accordingly, there is a need for a ceramic matrix composite component and method of producing a ceramic matrix composite component that includes forming one or more cooling channels in the interstices formed by the laid up plies that provides coupling to one or more non-line-of-sight channels or connections while minimizing the instance of cutting or damaging the laid up plies.

BRIEF DESCRIPTION

Aspects and advantages of the disclosure will be set forth in part in the following description, or may be obvious from the description, or may be learned through practice of the disclosure.

Methods are generally provided for forming a ceramic matrix composite (CMC) product, along with the resulting products formed from such methods. In one embodiment, the method includes: positioning a first plurality of ceramic matrix composite plies in a stack, disposing a filler pack on the plurality of ceramic matrix composite plies, wherein the filler pack includes one or more sacrificial fibers disposed therein; positioning a second plurality of ceramic matrix composite plies on top of the filler pack, the first plurality of ceramic composite plies, the second plurality of ceramic composite plies and the filler pack forming a pre-form component, wherein one of the first plurality of ceramic composite plies or the second plurality of ceramic composite plies include a bend angle, to define an interstice between the first plurality of ceramic composite plies and the second plurality of ceramic composite plies, the filler pack disposed in the interstice; performing one of: removing the one or more sacrificial fibers such that one or more functional features are formed along the pre-form component; or applying a fluid infiltrant to the pre-form component thereby densifying the pre-form component, performing the other of: removing the one or more sacrificial fibers such that one or more functional features are formed along the pre-form component; or applying a fluid infiltrant to the pre-form component thereby densifying the pre-form component; and forming one or more channels coupled to the one or more functional features for the flow of a cooling fluid therethrough.

In an alternate embodiment, the method includes positioning a first plurality of ceramic matrix composite plies in a stack, disposing a filler pack on the plurality of ceramic matrix composite plies, wherein the filler pack includes one or more sacrificial fibers disposed therein; positioning a second plurality of ceramic matrix composite plies on top of the filler pack, wherein the first plurality of ceramic composite plies, the second plurality of ceramic composite plies and the filler pack form a pre-form component, wherein one of the first plurality of ceramic composite plies or the second plurality of ceramic composite plies include a bend angle, to define an interstice between the plurality of ceramic matrix composite plies, the filler pack disposed in the interstice; removing the sacrificial fibers such that one or more elongate channels are formed along the pre-form component; applying a fluid infiltrant to the pre-form component thereby densifying the pre-form component; and forming one or more channels coupled to the one or more functional features for the flow of a cooling fluid therethrough.

In yet another embodiment, the ceramic matrix composite component includes a plurality of ceramic matrix composite plies forming a densified body including one or more interstice between the plurality of ceramic matrix composite plies; a filler pack disposed in each of the one or more interstice, wherein the filler pack includes a functional feature formed therein; a fluid source in fluid communication with the functional feature; and one or more channels in fluid communication with the functional feature to provide a flow of fluid from a fluid source to an exterior of the ceramic matrix composite component.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended drawings, in which.

Wherever possible, the same reference numbers will be used throughout the drawings to represent the same parts.

DETAILED DESCRIPTION

Figure 1:
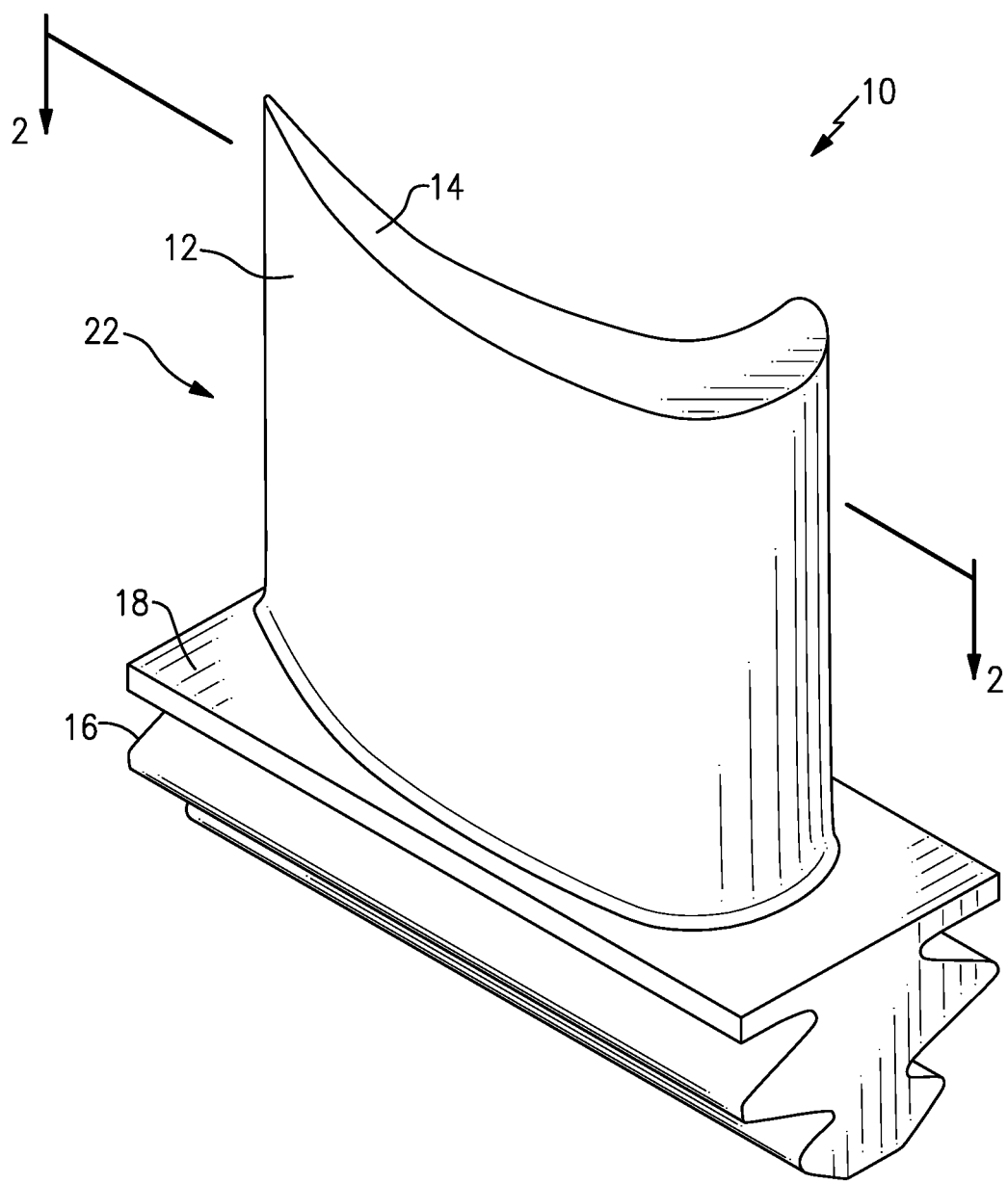
FIG. 1 is a perspective view of a ceramic matrix component (CMC), in accordance with one or more embodiments disclosed herein.

Embodiments of the present disclosure, for example, in comparison to concepts failing to include one or more of the features disclosed herein, enable the formation of one or more cooling channels in a CMC component, and more particularly, the fabrication of at least cooling channel within a filler pack disposed near the interstices of a plurality of CMC layers. The inclusion of the cooling channel at the interstices of the one or more CMC layers provides for maintenance of the component structural integrity in that line-or-sight drilling is not required to couple the cooling channel inlets and outlets to the cooling channel body. The method, according to the present disclosure, has decreased complexity with low cost, and more efficient cooling with the ability to reduce the cooling demand and flow-rate of the part When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, Hydrogen would be represented by its common chemical abbreviation H; Helium would be represented by its common chemical abbreviation He; and so forth.

As used herein, the "average particle diameter" or "average fiber diameter" refers to the diameter of a particle or fiber such that about 50% of the particles or fibers have a diameter that is greater than that diameter, and about 50% of the particles or fibers have a diameter that is less than that diameter.

As used herein, "substantially" refers to at least about 90% or more of the described group. For instance, as used herein, "substantially all" indicates that at least about 90% or more of the respective group have the applicable trait and "substantially no" or "substantially none" indicates that at least about 90% or more of the respective group do not have the applicable trait. As used herein, the "majority" refers to at least about 50% or more of the described group. For instance, as used herein, "the majority of" indicates that at least about 50% or more of the respective group have the applicable trait.

A ceramic matrix composite product (a "CMC product"), particularly a ceramic matrix composite product formed from melt infiltration, is generally provided herein, along with methods of forming such product. The CMC product is formed a plurality of ply layers including a bend radii that provides for disposing of a filler pack including a sacrificial fiber in the interstices of the plurality of ply layers. The sacrificial fibers enable the forming of one or more elongated functional features for enhancing the function of the CMC, such a cooling channels in the CMC preform. Forming the functional feature, and more particularly the cooling channels, in the filler pack allows for coupling to an inlet and outlet without the need for line-of-sight drilling through the ply layers, thus allowing for an improved CMC product.

Figure 2:
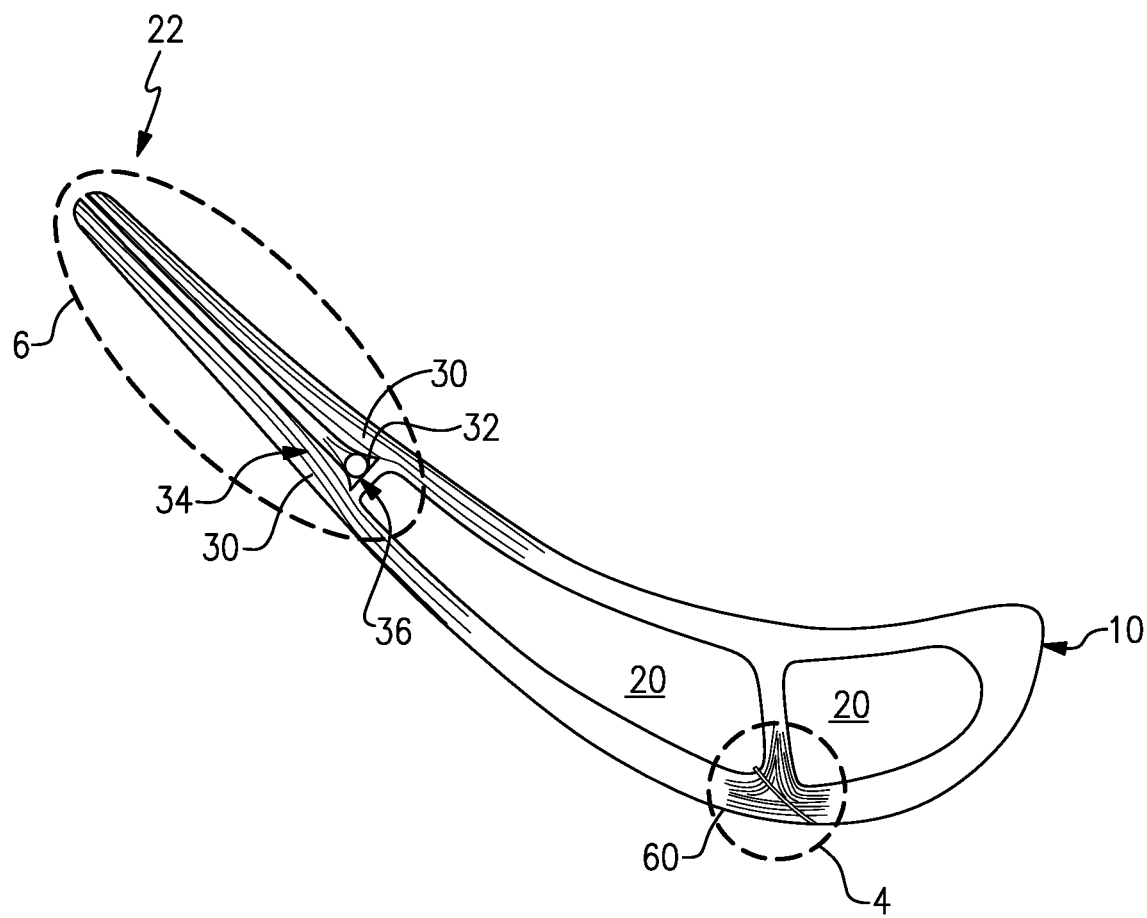
FIG. 2 is a sectional view taken in direction 2-2 of FIG. 1, in accordance with one or more embodiments disclosed herein.
Figure 3:
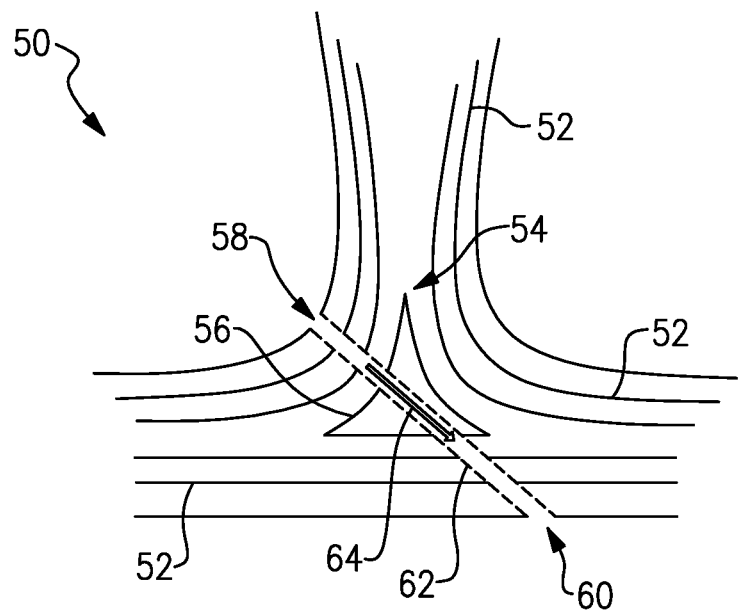
FIG. 3 is a sectional view of a portion of a ceramic matrix composite (CMC) component, known in the art.

Systems used to generate power include, but are not limited to, gas turbines, steam turbines, and other turbine assemblies, such as land based aero-derivatives, used for power generation. In certain applications, the power generation systems, including the turbomachinery, therein (e.g., turbines, compressors, and pumps) and other machinery, may include components that are exposed to heavy wear conditions. For example, certain power generation system components, such as blades, buckets, casings, rotor wheels, shafts, shrouds, nozzles, and so forth, may operate in high heat and/or high revolution environments. These components are manufactured using ceramic matrix composites and these components may also include cooling passages. The present disclosure provides a method to form ceramic matrix composite (CMC) components including cooling passages. An exemplary embodiment of the disclosure is shown in FIGS. 1-3 as a turbine airfoil, but the present disclosure is not limited to the illustrated structure.

FIG. 1 is a perspective view of a component 10, such as, but not limited to, a turbine blade or turbine vane. Although FIG. 1 shows a turbine blade, other suitable components, according to the present disclosure, include, but are not limited to, a combustor liner, a blade, a shroud, a nozzle, a nozzle end wall, a blade platform or other hot gas path component. Component 10 is preferably formed of a ceramic matrix composite (CMC) material. As used herein, ceramic matrix composite or "CMCs" refers to composites comprising a ceramic matrix reinforced by ceramic fibers. Some examples of CMCs acceptable for use herein can include, but are not limited to, materials having a matrix and reinforcing fibers comprising oxides, carbides, nitrides, oxycarbides, oxynitrides and mixtures thereof. Examples of non-oxide materials include, but are not limited to, CMCs with a silicon carbide matrix and silicon carbide fiber (when made by silicon melt infiltration, this matrix will contain residual free silicon); silicon carbide/silicon matrix mixture and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Accordingly, as used herein, the term "ceramic matrix composite" includes, but is not limited to, carbon-fiber-reinforced carbon (C/C), carbon-fiber-reinforced silicon carbide (C/SiC), and silicon-carbide-fiber-reinforced silicon carbide (SiC/SiC). In one embodiment, the ceramic matrix composite material has increased elongation, fracture toughness, thermal shock, and anisotropic properties as compared to a (non-reinforced) monolithic ceramic structure.

There are several methods that can be used to fabricate SiC—SiC CMCs. In one approach, the matrix is partially formed or densified through melt infiltration (MI) of molten silicon or silicon containing alloy into a CMC preform. In another approach, the matrix is at least partially formed through chemical vapor infiltration (CVI) of silicon carbide into a CMC preform. In a third approach, the matrix is at least partially formed by pyrolyzing a silicon carbide yielding pre-ceramic polymer. This method is often referred to as polymer infiltration and pyrolysis (PIP). Combinations of the above three techniques can also be used.

In one example of the MI CMC process, a boron-nitride based coating system is deposited on SiC fiber. The coated fiber is then impregnated with matrix precursor material in order to form prepreg tapes. One method of fabricating the tapes is filament winding. The fiber is drawn through a bath of matrix precursor slurry and the impregnated fiber wound on a drum. The matrix precursor may contain silicon carbide and or carbon particulates as well as organic materials. The impregnated fiber is then cut along the axis of the drum and is removed from the drum to yield a flat prepreg tape where the fibers are nominally running in the same direction. The resulting material is a unidirectional prepreg tape. The prepreg tapes can also be made using continuous prepregging machines or by other means. The tape can then be cut into shapes, layed up, and laminated to produce a preform.

The preform is pyrolyzed, or burned out, in order to char any organic material from the matrix precursor and to create porosity. Molten silicon is then infiltrated into the porous preform, where it can react with carbon to form silicon carbide. Ideally, excess free silicon fills any remaining porosity and a dense composite is obtained. The matrix produced in this manner typically contains residual free silicon.

The prepreg MI process generates a material with a two-dimensional fiber architecture by stacking together multiple one-dimensional prepreg plies where the orientation of the fibers is varied between plies. Plies are often identified based on the orientation of the continuous fibers. A zero degree orientation is established, and other plies are designed based on the angle of their fibers with respect to the zero degree direction. Plies in which the fibers run perpendicular to the zero direction are known as 90 degree plies, cross plies, or transverse plies.

The MI approach can also be used with two-dimensional or three-dimensional woven architectures. An example of this approach would be the slurry-cast process, where the fiber is first woven into a three-dimensional preform or into a two-dimensional cloth. In the case of the cloth, layers of cloth are cut to shape and stacked up to create a preform. A chemical vapor infiltration (CVI) technique is used to deposit the interfacial coatings (typically boron nitride based or carbon based) onto the fibers. CVI can also be used to deposit a layer of silicon carbide matrix. The remaining portion of the matrix is formed by casting a matrix precursor slurry into the preform, and then infiltrating with molten silicon.

An alternative to the MI approach is to use the CVI technique to densify the Silicon Carbide matrix in one-dimensional, two-dimensional or three-dimensional architectures. Similarly, PIP can be used to densify the matrix of the composite. CVI and PIP generated matrices can be produced without excess free silicon. Combinations of MI, CVI, and PIP can also be used to densify the matrix.

Component 10 includes an airfoil 12 against which a flow of hot exhaust gas is directed. The airfoil 12 extends from a tip 14 to a dovetail 16. Component 10 is mounted to a turbine disk (not shown) by the dovetail 16 which extends downwardly from the airfoil 12 and engages a slot on the turbine disk. A platform 18 extends laterally outwardly from the area where the airfoil 12 is joined to the dovetail 16. The component 10 includes at least one plenum 20, as shown in FIG. 2, extending along the interior of the airfoil 12. During operation of a power generation system, a flow of cooling air (not shown) is directed through the plenum 20 to reduce the temperature of the airfoil 12.

FIG. 2 is a sectional view of the component 10 taken in direction 2-2 of FIG. 1 showing a plurality of functional features (described presently), and more particularly a plurality of cooling channels formed in component 10. A plurality of ceramic matrix composite (CMC) plies 30 (only a few have been shown for clarity) surround a filler pack 32 at an interstice 34 of the plies 30 for each functional feature. A functional feature 36 is formed in each of the filler packs 32. As shown in FIG. 2, the functional features 36 are in fluid communication with the plenum 20 via an inlet (described presently) and exterior the component 10 via an outlet (described presently) that extends between the ceramic matrix composite plies 30. In an alternate embodiment, at least one of the plurality of functional features 36 may be in fluid communication with an alternative source of cooling fluid (not shown).

FIG. 3 is a schematic sectional view of a portion of a prior art component 50 showing a plurality of CMC plies 52 including a filler pack 56 disposed in the interstice 54 formed between the plies 52. Subsequent to laying down the plurality of CMC plies 52, a channel 62, including a line-of-sight inlet 58 and outlet 60, is formed by drilling through the plurality of CMC plies 52. The channel 62 extends through the CMC plies 52 and forms an opening through the CMC plies 52 sufficient to permit flow of fluid 64 therethrough. The channel 62 is open to and fluidly communicate with a plenum, such as plenum 20 of FIG. 2, and external to the component 50. In an alternate embodiment, the channel 62 may be in fluid communication with an alternative source of cooling fluid (not shown). To form the channel 62, the CMC plies 52 must be drilled through weakening the overall strength of the CMC plies 52 and resultant component 50.

In the embodiment of FIG. 3, the arrangement of ceramic matrix composite plies 52, the channel 62, and the filler pack 56 are schematic and have been enlarged for illustration purposes. The size and geometry of the CMC plies 52 and voids, such as channel 62, are not limited to those shown in FIG. 2.

Figure 4:
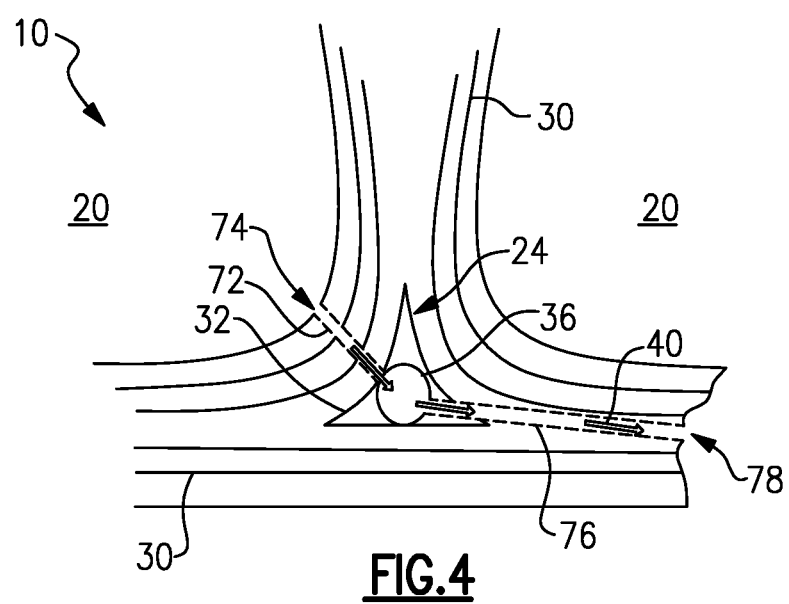
FIG. 4 is an enlargement of a portion of the ceramic matrix composite (CMC) component of FIG. 2, in accordance with one or more embodiments disclosed herein.

Referring now to FIG. 4, illustrated is a schematic sectional view of a portion of the component 10 as indicated by dotted circle 4 in FIG. 2, showing the plurality of CMC plies 30 including a filler pack 32 disposed in the interstice 34 formed between the plies 30. In contrast to the embodiment of FIG. 3, in this disclosed embodiment, the filler pack 32 has formed therein the functional feature 36. In an embodiment, the functional feature 36 is an elongate channel that serves as a cooling manifold 70 for the passage therethrough of a cooling fluid flow 40, also referred to herein as fluid flow 40.

Subsequent to laying down the plurality of CMC plies 30 and fabrication of the functional feature 36 (described presently), one or more first channels 72 (of which only a one is illustrated) are formed in fluid communication with the functional feature 36, such as by drilling through the plurality of CMC plies 30. An inlet 74 provides for an input of the cooling fluid low 40. In this embodiment, each of the plurality of first channels 72 extends from the plenum 20 (FIG. 2) through the CMC plies 30 to the functional feature 36 and forms an opening through the CMC plies 30 sufficient to permit flow of the cooling fluid flow 40 therethrough. In addition, a plurality of second channels 76 (of which only one is illustrated) are formed, such as by drilling parallel with the plurality of CMC plies 30, so as to not cut through the plies. Each of the second channels 76 extends from the functional feature 36 to the exterior of the component 10, via an outlet 78 and forms an opening sufficient to permit flow of the cooling fluid flow 40 therethrough. In the illustrated embodiment, the plurality of first channels 72 and the plurality of second channels 76 are open to and fluidly communicate with a plenum, such as plenum 20 of FIG. 2, and to the exterior of the component 10. In an alternative embodiment, each of the plurality of first channels 72 and the plurality of second channels 76 are open to and fluidly communicate with an alternate source of cooling fluid flow (not shown). In contrast to the prior art embodiment of FIG. 3, by forming the plurality of second channels 76 between the plurality of CMC plies 30, the overall strength of the CMC plies 30 and resultant component 10 is not weakened.

In the embodiment of FIG. 4, the arrangement of ceramic matrix composite plies 30, the functional feature 36, the first channel 72, the second channel 76, the inlet 74, the outlet 78 and the filler pack 56 are schematic and have been enlarged for illustration purposes. The size and geometry of the CMC plies and voids are not limited to those shown in FIG. 4.

Figure 5:
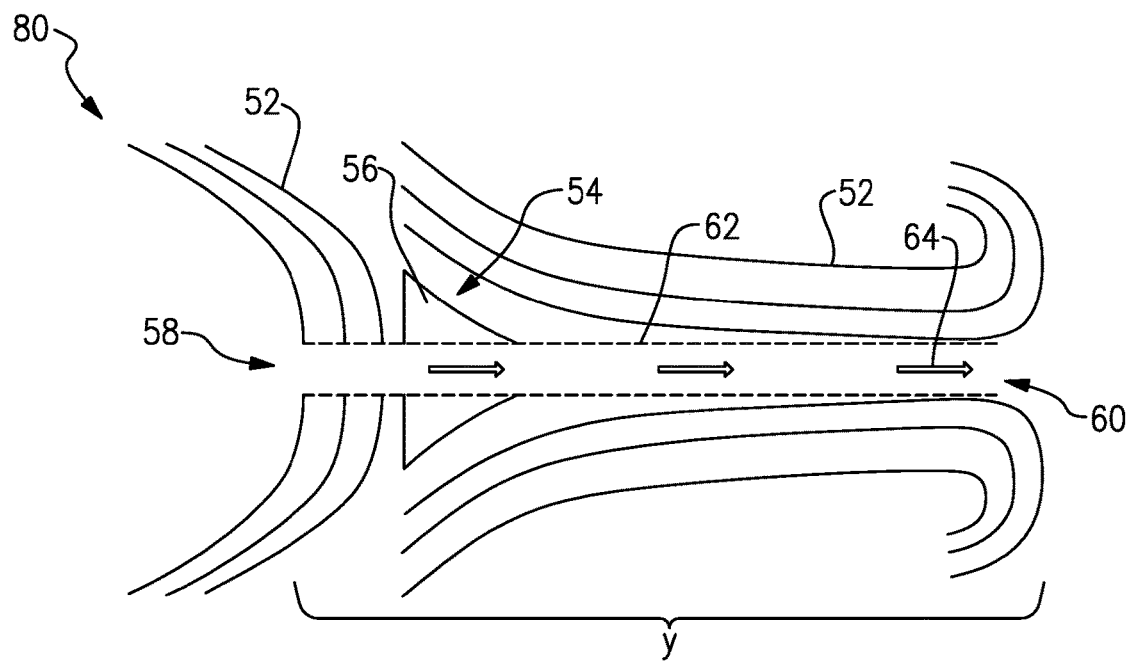
FIG. 5 is a sectional view of another embodiment of a portion of a ceramic matrix composite (CMC) component, known in the art.

Referring now to FIG. 5, illustrated is schematic sectional view of a portion of another prior art component 80, and more particularly a trailing edge of a turbine airfoil structure showing a plurality of CMC plies 52 including a filler pack 56 disposed in the interstice 54 formed between the plies 52. Subsequent to laying down the plurality of CMC plies 52, a channel 62, including a line-of-sight inlet 58 and outlet 60, is formed by drilling through the plurality of CMC plies 52. The channel 62 extends a distance "y" through the CMC plies 52 and forms an opening through the CMC plies 52 sufficient to permit flow of fluid 64 therethrough. The channel 62 is open to and fluidly communicate with a plenum, such as plenum 20 of FIG. 2, and external to the component 80. In an alternate embodiment, the channel 62 may be in fluid communication with an alternative source of cooling fluid (not shown). To form the channel 62, the CMC plies 52 must be drilled through weakening the overall strength of the CMC plies 52 and resultant component 80.

In the embodiment of FIG. 5, the arrangement of ceramic matrix composite plies 52, the channel 62, and the filler pack 56 are schematic and have been enlarged for illustration purposes. The size and geometry of the CMC plies and voids are not limited to those shown in FIG. 5.

Figure 6:
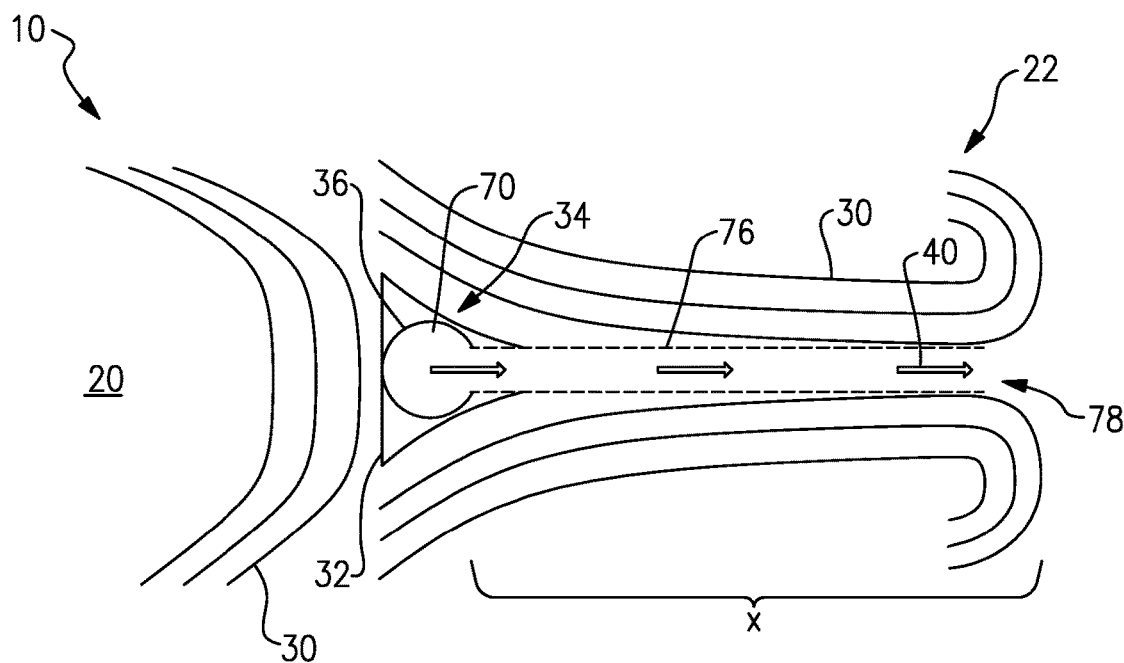
FIG. 6 is an enlargement of a portion of the ceramic matrix composite (CMC) component of FIG. 2, in accordance with one or more embodiments disclosed herein.

Referring now to FIG. 6, illustrated is a schematic sectional view of a portion of the component 10, and more particularly a trailing edge 22, as indicated by dotted circle 6 in FIG. 2, showing the plurality of CMC plies 30 including a filler pack 32 disposed in the interstice 34 formed between the plies 30. In contrast to the embodiment of FIG. 5, in this disclosed embodiment, the filler pack 32 has formed therein the functional feature 36. In an embodiment, the functional feature 36 is an elongate channel that serves as a cooling manifold 70 for the passage therethrough of a cooling fluid flow 40. Subsequent to laying down the plurality of CMC plies 30 and fabrication of the functional feature 36 (described presently), one or more first channels (not shown) each including an inlet are formed, such as by drilling through the plurality of CMC plies 30. Each of the plurality of first channels extends from the plenum 20 through the CMC plies 30 to the functional feature 36 and forms an opening through the CMC plies 30 sufficient to permit flow of the cooling fluid flow 40 therethrough. In addition, a plurality of second channels 76 (of which only one is illustrated) each including an outlet 78 are formed, such as by drilling parallel with the plurality of CMC plies 30, so as to not cut through the plies. Each of the second channels 76 extends from the functional feature 36 to the exterior of the component 10 and forms an opening sufficient to permit flow of the cooling fluid flow 40 therethrough. The plurality of first channels and the plurality of second channels 76 are open to and fluidly communicate with a plenum, such as plenum 20 of FIG. 2, and to the exterior of the component 10. In an alternative embodiment, the functional feature 36 and the plurality of second channels 76 are open to and fluidly communicate with an alternate source of cooling fluid flow (not shown). In contrast to the prior art embodiment of FIG. 5, by forming the plurality of second channels 76 between the plurality of CMC plies 30, the overall strength of the CMC plies 30 and resultant component 10 is not weakened. In addition, by forming the functional features 36 within the interstice 34 between the plurality of plies 30, the overall strength of the CMC plies 30 and resultant component 10 is not weakened As illustrated in FIG. 6, the distance "x" required to drill through the CMC plies 30 to couple the functional feature 36, and thus the supply of cooling fluid 40, to an exterior of the component 10 is less than the distance "y" required to drill through the known component 80 of FIG. 5 to couple the functional feature 36 to an exterior of the component 80.

In the embodiment of FIG. 6, the arrangement of ceramic matrix composite plies 30, the functional feature 36, the second channel 76, the outlet 78 and the filler pack 56 are schematic and have been enlarged for illustration purposes. The size and geometry of the CMC plies and voids are not limited to those shown in FIG. 6.

Figure 7:
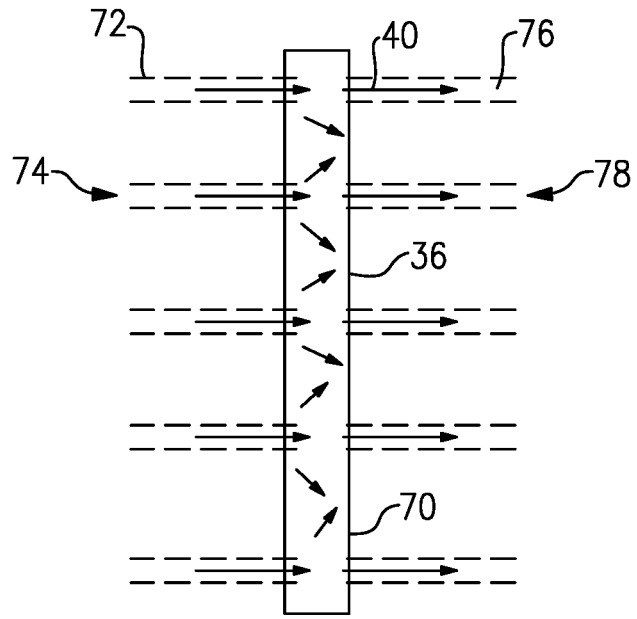
FIG. 7 is a schematic view of a cooling manifold including inlet and outlets, in accordance with one or more embodiments disclosed herein.

Referring now to FIGS. 7-10, illustrated are alternative embodiments for coupling the functional feature 36, such as the cooling manifold 70, to the inlet 74 and outlet 78 of FIGS. 2, 4 and 6 via the one or more first channels 72 and the one or more second channels 76. Illustrated in FIG. 7, is an embodiment including straight alignment of the inlet 74 of each of the one or more first channels 72 with a respective outlet 78 of the one or more second channels 76.

Figure 8:
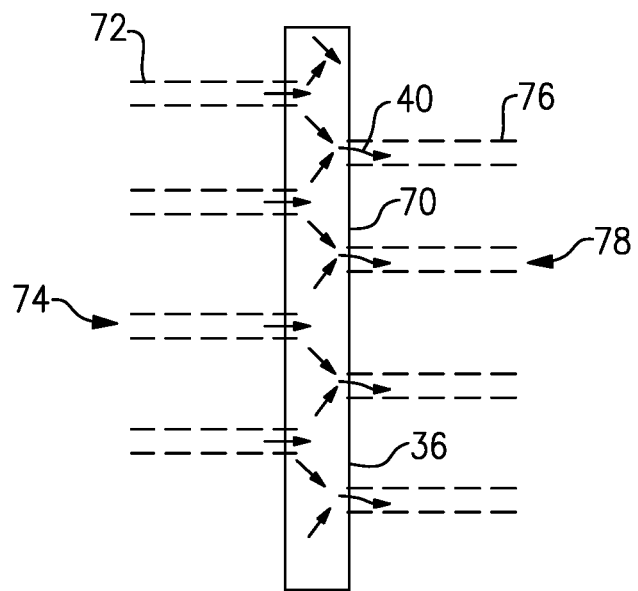
FIG. 8 is a schematic view of another embodiment of a cooling manifold including inlet and outlets, in accordance with one or more embodiments disclosed herein.

Illustrated in FIG. 8, is an embodiment including an offset alignment of the inlet 74 of each of the one or more first channels 72 with a respective outlet 78 of the one or more second channels 76.

Figure 9:
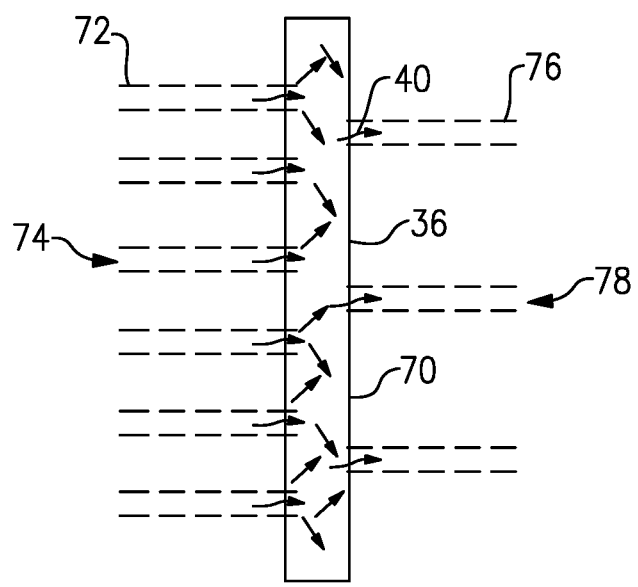
FIG. 9 is a schematic view of another embodiment of a cooling manifold including inlet and outlets, in accordance with one or more embodiments disclosed herein.

Illustrated in FIG. 9, is an embodiment wherein at least two inlets 74 of the one or more first channels 72 is fluidically coupled to a single outlet 78 of the one or more second channels 76. In this embodiment, the outgoing flow of cooling fluid 40 is split.

Figure 10:
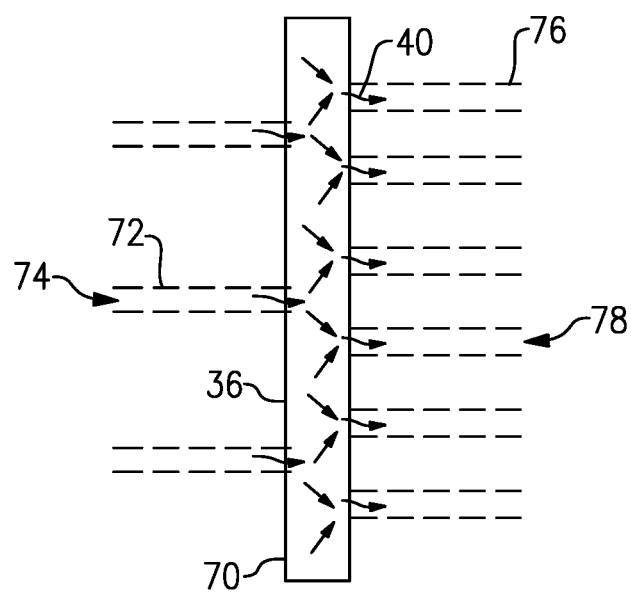
FIG. 10 is a schematic view of another embodiment of a cooling manifold including inlet and outlets, in accordance with one or more embodiments disclosed herein.

Illustrated in FIG. 10, is an embodiment wherein an inlet 74 from each of the one or more first channels 72 is fluidically coupled to at least two outlets 78 of the one or more second channels 76. In this embodiment, the incoming flow of cooling fluid 40 is split to exit outlets 78.

Figure 11:
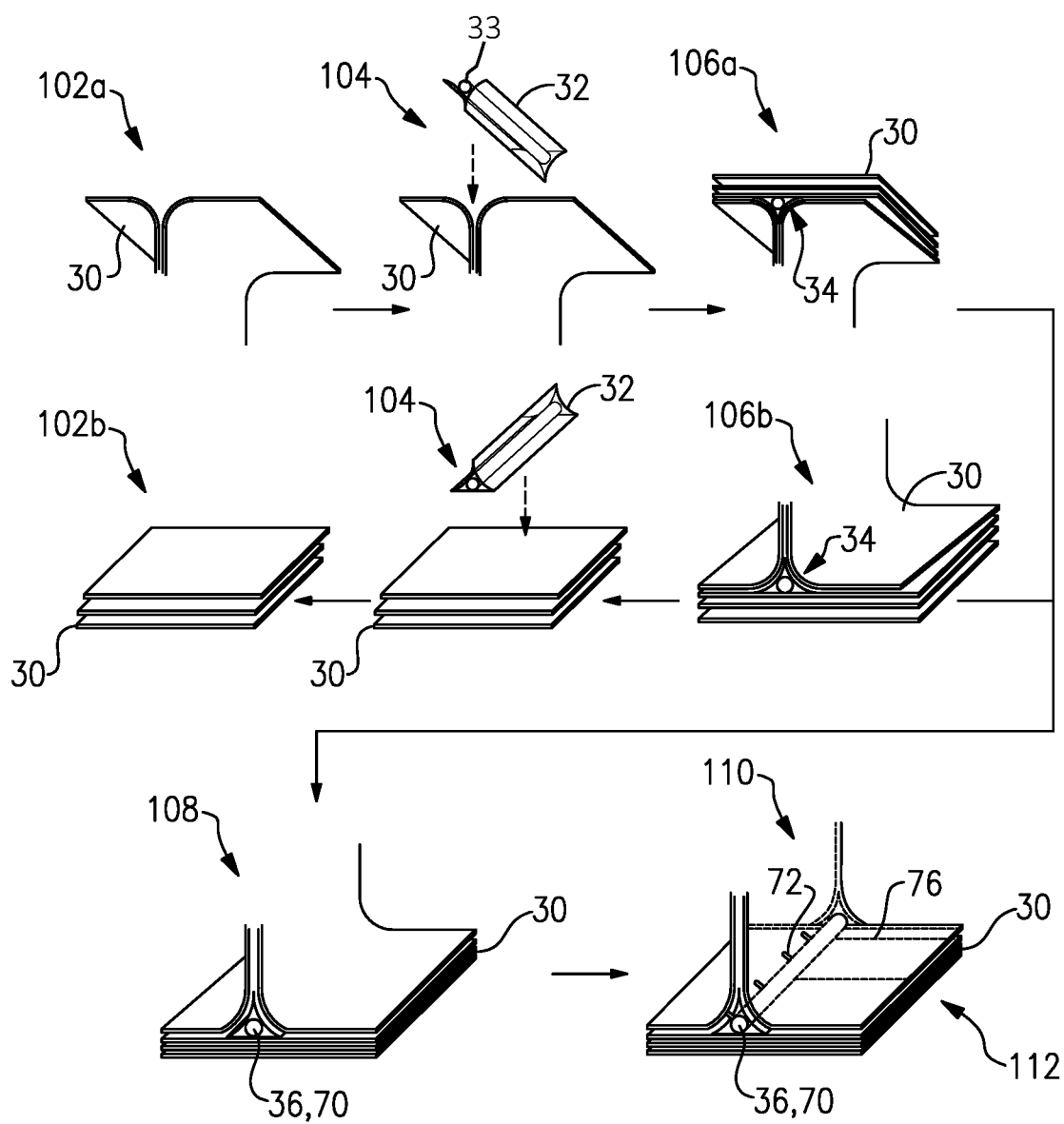
FIG. 11 schematically shows a perspective view of a method for forming a CMC component, in accordance with one or more embodiments disclosed herein.

FIG. 11 schematically shows a method of forming the CMC component 10, according to the present disclosure, having one or more functional features disposed therein, and more specifically, a cooling manifold disposed therein a filler pack (see also, FIGS. 2, 4 and 6). As shown in FIG. 11, component 10 is formed using a lay-up technique. Method 100 includes providing a ceramic matrix composite ply 30 (step 102a, 102b). The ceramic matrix composite ply 30 may be a single ply or a plurality of plies, such as a series of plies formed into a laminate stack. An example of material for plies 30 includes, but is not limited to, pre-preg composite plies including, for example, woven carbon fiber, binder material and coated SiC fibers, as previously described.

In a first embodiment, as illustrated in step 102a, a plurality of plies 30 having a bend angle θ, where θ is less than 180° are first laid up. In an alternative embodiment, as illustrated in step 102b, the plurality of plies 30 are initially laid up in a substantially planar stack. After providing ceramic matrix composite plies 30, a filler pack 32 is disposed relative to the plurality of plies 30, in a step 104. As previously described, the filler pack 32 includes a means for defining a functional feature therein, such as a sacrificial fiber 33. The sacrificial fiber 33 enables the forming of the one or more elongated functional features 36 for enhancing the function of the CMC, such a cooling channels in the CMC preform. Fabrication of functional features using sacrificial fibers are discussed in commonly assigned, U.S. Pat. No. 10,384,981, D. Hall et al., "Methods of Forming Ceramic Matrix Composites Using Sacrificial Fibers and Related Products," which is incorporated herein in its entirety and U.S. Pat. No. 10,995,039, D. Dunn et al., "Methods of Forming Ceramic Matrix Composites Using Sacrificial Fibers and Non-Wetting Coating", which is incorporated herein in its entirety. The geometry of the filler pack 32 and the functional feature 36 defined therein includes any suitable geometry including a rounded, curved, elliptical, rectilinear or other suitable geometry.

Next, in a step 106a, 106b, additional plies 30 are disposed to enclose the filler pack 32. In the first embodiment, as illustrated in step 106a, the plurality of additional plies 30 are laid up on top of the filler pack 32 in a substantially planar stack to define an interstice 34 between the plurality of plies 30. In the alternative embodiment, as illustrated in step 106b, the plurality of additional plies 30 are laid up on top of the filler pack 32 and include a bend angle θ, where θ is less than 180°, to define the interstice 34 between the plurality of plies 30.

During fabrication, the filler pack 32, having the incomplete functional feature 36 defined therein, forms a pre-form component with the ceramic matrix composite plies 30 surrounding the filler pack. The pre-form component is placed in an autoclave and an autoclave cycle is completed, in a step 108. The pre-form component is subject to typical autoclave pressures and temperature cycles used in the industry for ceramic composite materials. Autoclaving pulls out any volatiles remaining in the plies and autoclave conditions can be varied depending on the ply material. After autoclaving, a burn-out method is performed to remove any remaining material or additional binders in the pre-form component. The burn-out method is generally conducted at a temperature of approximately 426-648° C. (approximately 800-1200° F.).

After burn-out, the pre-form component is placed in a vacuum furnace for densification. Densification is performed using any known densification technique including, but not limited to, Silicomp, melt infiltration (MI), chemical vapor infiltration (CVI), polymer inflation pyrolysis (PIP), and oxide/oxide methods. Densification can be conducted in a vacuum furnace having an established atmosphere at temperatures above 1200° C. to allow Silicon or other fluid infiltrant material to melt-infiltrate into the pre-form component. One suitable method of densification is melt infiltration wherein molten matrix material is drawn into the plies 30 and permitted to solidify. The pre-form component includes a terminal diameter (not shown) for the functional feature 36, and more particularly, the manifold 70 (FIGS. 4 and 6) such that the matrix material is permitted to infiltrate and solidify to form a cap or blockage of densified matrix material. After densification, the densified pre-form component or densified body includes the filler pack 36 having the sacrificial fiber 33 disposed therein, as shown in step 110, and forms at least a portion of component 10.

Subsequent to densification, the functional feature 36 is further formed by removing the sacrificial fiber 33, to leave an elongated channel, or cooling manifold, 70 formed in the filler pack 32, in a step 110. As previously described, the removal of the sacrificial fibers 33 to form elongate channels is discussed in commonly assigned U.S. Pat. Nos. 10,384, 981 and 10,995,039. In one embodiment, the functional feature 36 is formed as an elongate cooling manifold 70 (FIGS. 4 and 6).

In an alternate embodiment, the functional feature 36 is further formed by removing the sacrificial fiber 33, to leave an elongated channel, or cooling manifold, 70 formed in the filler pack 32, prior to densification as described in step 108.

In an embodiment, internal hollow portion of the functional feature 36 is sufficiently large and open in the component 10 such that coolant or other fluid can be directed therethrough to provide cooling to component 10. However, as previously described, the densified matrix material formed at the ceramic matrix composite ply 30 forms a blockage that substantially prevents flow of coolant or other fluids and more particularly, forms the functional features 36 as a closed structure that is internal to the component 10. In an embodiment, openings are machined or otherwise formed into the component 10 to provide inlets and/or outlets to the functional feature 36 to permit flow therethrough. More particularly, additionally in step 110, one or more channels 72, 76 are formed to couple the functional feature 36, and more particularly, the cooling manifold 70 to a source of cooling fluid (i.e. plenum 20, FIG. 2) and an exterior of the component 10. To form the one or more channels 72, 76, suitable techniques include, laser drilling, electrical discharge machining, cutting or machining the ceramic matrix composite material of the ceramic matrix composite ply 30. In an embodiment, the channels 76 are formed between continuous plies 30.

The one or more channels 72, 76 for cooling may be fed and/or exhausted to and/or from the plenum 20, other functional channels or external to the component, by machining or otherwise forming openings, such as feed holes and hot-gas path dump holes, into the component 10.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of producing a ceramic matrix composite component, the method comprising:
   positioning a first plurality of ceramic matrix composite plies in a stack,
   disposing a filler pack on the plurality of ceramic matrix composite plies, wherein the filler pack includes one or more sacrificial fibers disposed therein;
   positioning a second plurality of ceramic matrix composite plies on top of the filler pack, the first plurality of ceramic composite plies, the second plurality of ceramic composite plies and the filler pack forming a pre-form component,
   wherein one of the first plurality of ceramic composite plies or the second plurality of ceramic composite plies include a bend angle, to define an interstice between the first plurality of ceramic composite plies and the second plurality of ceramic composite plies, the filler pack disposed in the interstice;
   performing one of:
      removing the one or more sacrificial fibers such that one or more functional features are formed along the pre-form component; or
      applying a fluid infiltrant to the pre-form component thereby densifying the pre-form component,
   performing the other of:
      removing the one or more sacrificial fibers such that one or more functional features are formed along the pre-form component; or
      applying a fluid infiltrant to the pre-form component thereby densifying the pre-form component; and
   forming one or more channels coupled to the one or more functional features for the flow of a cooling fluid therethrough.

2. The method of claim 1, wherein the one or more functional features are entirely enclosed within the densified body.

3. The method of claim 1, wherein the one or more functional features is a cooling manifold.

4. The method of claim 1, wherein forming one or more channels coupled to the one or more functional features provides at least one of the channels does not cut through the first plurality of ceramic matrix composite plies and the second ceramic matrix composite plies.

5. The method of claim 1, wherein forming one or more channels coupled to the one or more functional features provides at least one of the channels is formed between one of the first plurality of ceramic matrix composite plies or the second ceramic matrix composite plies.

6. The method of claim 1, wherein forming one or more channels coupled to the one or more functional features provides at least one of the channels is formed at an airfoil trailing edge.

7. The method of claim 1, wherein the ceramic matrix composite plies are pre-impregnated ceramic matrix composite plies.

8. The method of claim 1, wherein the forming of the one or more channels coupled to the one or more functional features is by a method selected from the group consisting of laser drilling, electrical discharge machining, cutting and machining.

9. The method of claim 1, wherein the densifying includes melt infiltration.

10. The method of claim 9, wherein the fluid infiltrant comprises silicon or a silicon alloy.

11. The method of claim 1, wherein the ceramic matrix composite component is a hot gas path turbine component.

12. The method of claim 11, wherein the hot gas path turbine component is selected from the group consisting of a combustor liner, a blade, a shroud, a nozzle, a nozzle end wall, and a blade platform.

13. A method of producing a ceramic matrix composite component, the method comprising:
   positioning a first plurality of ceramic matrix composite plies in a stack,
   disposing a filler pack on the plurality of ceramic matrix composite plies, wherein the filler pack includes one or more sacrificial fibers disposed therein;
   positioning a second plurality of ceramic matrix composite plies on top of the filler pack, wherein the first plurality of ceramic composite plies, the second plurality of ceramic composite plies and the filler pack form a pre-form component,
   wherein one of the first plurality of ceramic composite plies or the second plurality of ceramic composite plies include a bend angle, to define an interstice between the plurality of ceramic matrix composite plies, the filler pack disposed in the interstice;
   removing the sacrificial fibers such that one or more elongate channels are formed along the pre-form component;
   applying a fluid infiltrant to the pre-form component thereby densifying the pre-form component; and
   forming one or more channels coupled to the one or more functional features for the flow of a cooling fluid therethrough.

14. The method of claim 13, wherein the one or more functional features are entirely enclosed within the densified body.

15. The method of claim 13, wherein the one or more functional features is a cooling manifold.

16. A ceramic matrix composite component, comprising:
- a plurality of ceramic matrix composite plies forming a densified body including one or more interstice between the plurality of ceramic matrix composite plies;
- a filler pack disposed in each of the one or more interstice, wherein the filler pack includes a functional feature formed therein;
- a fluid source in fluid communication with the functional feature; and
- one or more channels in fluid communication with the functional feature to provide a flow of fluid from a fluid source to an exterior of the ceramic matrix composite component.

17. The ceramic matrix composite component of claim 16, wherein the functional feature is entirely enclosed within the densified body.

18. The ceramic matrix composite component of claim 16, wherein the functional feature is a cooling manifold.

19. The ceramic matrix composite component of claim 16, wherein the ceramic matrix composite component is a hot gas path turbine component.

20. The ceramic matrix composite component of claim 19, wherein the hot gas path turbine component is selected from the group consisting of a combustor liner, a blade, a shroud, a nozzle, a nozzle end wall, and a blade platform.

\* \* \* \* \*